United States Patent
Chen

(10) Patent No.: US 9,693,176 B2
(45) Date of Patent: Jun. 27, 2017

(54) INFORMATION PROCESSING METHOD AND ELECTRONIC APPARATUS

(71) Applicant: Lenovo (Beijing) Co., Ltd., Beijing (CN)

(72) Inventor: Sisi Chen, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/633,890

(22) Filed: Feb. 27, 2015

(65) Prior Publication Data

US 2016/0088587 A1 Mar. 24, 2016

(30) Foreign Application Priority Data

Sep. 19, 2014 (CN) .......................... 2014 1 0482382

(51) Int. Cl.
| | |
|---|---|
| H04W 4/00 | (2009.01) |
| H04M 1/725 | (2006.01) |
| H04M 19/04 | (2006.01) |
| H04W 88/04 | (2009.01) |
| H04W 88/06 | (2009.01) |

(52) U.S. Cl.
CPC ......... *H04W 4/008* (2013.01); *H04M 1/7253* (2013.01); *H04M 19/047* (2013.01); *H04M 1/72569* (2013.01); *H04W 88/04* (2013.01); *H04W 88/06* (2013.01)

(58) Field of Classification Search
CPC . H04W 68/005; H04W 4/008; H04M 1/7253; H04M 19/047
USPC ....................... 455/41.1, 41.2, 567
See application file for complete search history.

(56) References Cited

U.S. PATENT DOCUMENTS

| | | | |
|---|---|---|---|
| 2009/0005024 A1 | 1/2009 | Kato | |
| 2014/0171055 A1* | 6/2014 | Oshita | H04W 4/12 455/418 |

FOREIGN PATENT DOCUMENTS

| | | |
|---|---|---|
| CN | 101510796 | 8/2009 |
| CN | 103402009 | 11/2013 |

OTHER PUBLICATIONS

First Office Action dated Feb. 5, 2016 out of Chinese priority Application No. 201410482382.6 (12 pages including English translation).

\* cited by examiner

*Primary Examiner* — Tuan Pham
(74) *Attorney, Agent, or Firm* — Brinks Gilson & Lione; G. Peter Nichols

(57) ABSTRACT

An information processing method and an electronic apparatus are described. The method is applied to a first electronic apparatus and includes detecting a current state of the first electronic apparatus, when the first electronic apparatus receives first data information; sending the first data information to a second electronic apparatus connected with the first electronic apparatus, when the current state is a first state, so that the second electronic apparatus, after receiving the first data information, outputs a first prompt information; and outputting a second prompt information, when the current state is a second state different from the first state. In the technical solutions of the present disclosure, a new mode for controlling whether to perform the associated reminding between the electronic apparatuses or not is provided.

13 Claims, 4 Drawing Sheets

INFORMATION PROCESSING METHOD AND ELECTRONIC APPARATUS

This application claims priority to Chinese patent application No. 201410482382.6 filed on Sep. 19, 2014, the entire contents of which is incorporated herein by reference.

The present disclosure relates to a field of communication, and more particularly, to an information processing method and an electronic apparatus.

BACKGROUND

Interconnection between electronic apparatuses has brought a lot of convenience to users. For example, the interconnection between electronic apparatuses can implement an associated reminding between the electronic apparatuses. For example, when a mobile phone is connected with a computer, the mobile phone receives a short message and outputs a prompt information; and meanwhile the mobile phone sends information to the computer, and the computer terminal displays the information, and outputs a prompt information, to facilitate the user's viewing. By the associated reminding, an effect that the mobile phone and the computer share the information content can be achieved, and the user will not miss the information on the mobile phone when using the computer.

But sometimes, the associated reminding between the electronic apparatuses will cause the user inconvenience. For example, when the user is in a meeting, two electronic apparatuses, which are respectively a first electronic apparatus and a second electronic apparatus, remind the user at the same time, which will not play a role of reminding, but will disturb the user instead.

Typically, the user can only set whether to perform the associated reminding between the electronic apparatuses by changing connection between the first electronic apparatus and the second electronic apparatus. When the first electronic apparatus and the second electronic apparatus establish a connection, the second electronic apparatus can receive information sent by the first electronic apparatus, and outputs the prompt information. At this time, the associated reminding is performed between the first electronic apparatus and the second electronic apparatus. When the first electronic apparatus and the second electronic apparatus are disconnected, the second electronic apparatus cannot receive the information sent by the first electronic apparatus. At this time, the associated reminding will not be performed between the first electronic apparatus and the second electronic apparatus.

It can be seen that the associated reminding between the electronic apparatuses only are performed by changing connection settings between the electronic apparatuses.

SUMMARY

Embodiments of the present disclosure provide an information processing method and an electronic apparatus. A new mode for controlling whether to perform the associated reminding between the electronic apparatuses or not is provided.

According to a first aspect, an embodiment of the present disclosure provides an information processing method. The method comprises: detecting a state of a first electronic apparatus upon the first electronic apparatus receiving first data information; if the state of the first electronic apparatus is a first state, the first electronic apparatus sending the first data information to a second electronic apparatus connected with the first electronic apparatus, so that the second electronic apparatus outputs a first prompt information after receiving the first data information; and the first electronic apparatus outputting a second prompt information, if the state of the first electronic apparatus is a second state that is different from the first state.

By combining with the first aspect, in one implementation of the first aspect, after the detecting a state of the first electronic apparatus, the method may further comprises: not sending, by the first electronic apparatus, the first data information to the second electronic apparatus, if the state of the first electronic apparatus is the second state.

By combining with the first aspect and the implementation described above, in another implementation of the first aspect, the first electronic apparatus establishes a connection with the second electronic apparatus in a first communication mode; and the first electronic apparatus establishes a connection in a second communication mode with a third electronic apparatus which sends the first data information. The second communication mode is different from the first communication mode.

By combining with the first aspect and the implementation described above, in another implementation of the first aspect, if the first electronic apparatus is in the first state, the first electronic apparatus has a first average power consumption; and if the first electronic apparatus is in the second state, the first electronic apparatus has a second average power consumption. The first average power consumption is lower than the second average power consumption.

By combining with the first aspect and the implementation described above, in another implementation of the first aspect, if the first electronic apparatus is in the first state, a side portion of the first electronic apparatus and a user of the first electronic apparatus are in a non-contact state; if the first electronic apparatus is in the second state, the side portion of the first electronic apparatus and the user of the first electronic apparatus are in a contact state.

By combining with the first aspect and the implementation described above, in another implementation of the first aspect, after detecting the state of the first electronic apparatus, the method further comprises: generating and sending second data information to the second electronic apparatus if the state of the first electronic apparatus is the second state, the second data information including the first data information and identification information for indicating that the first electronic apparatus is in the second state According to a second aspect, an embodiment of the present disclosure further provides a first electronic apparatus. The first electronic apparatus includes: a detecting unit for detecting a state of the first electronic apparatus upon the first electronic apparatus receiving first data information; a communicating unit, connected with the detecting unit, for sending the first data information to a second electronic apparatus connected with the first electronic apparatus, if the state of the first electronic apparatus is a first state, so that the second electronic apparatus outputs a first prompt information after receiving the first data information; and a controlling unit, connected with the detecting unit, for controlling the first electronic apparatus to output a second prompt information if the state of the first electronic apparatus is a second state that is different from the first state.

By combining with the second aspect, in one implementation of the second aspect, the controlling unit is connected with the communicating unit, and the controlling unit is further operable to: control the communicating unit not to send the first data information to the second electronic apparatus, if the state of the first electronic apparatus is the second state.

By combining with the second aspect and the implementation described above, in another implementation of the second aspect, the first electronic apparatus is operable to establish a connection with the second electronic apparatus in a first communication mode; and the first electronic apparatus is operable to establish a connection in a second communication mode with a third electronic apparatus which sends the first data information, the second communication mode being different from the first communication mode.

By combining with the second aspect and the implementation described above, in another implementation of the second aspect, if the first electronic apparatus is in the first state, the first electronic apparatus has a first average power consumption; and if the first electronic apparatus is in the second state, the first electronic apparatus has a second average power consumption. The first average power consumption is lower than the second average power consumption.

By combining with the second aspect and the implementation described above, in another implementation of the second aspect, if the first electronic apparatus is in the first state, a side portion of the first electronic apparatus and a user of the first electronic apparatus are in a non-contact state; and if the first electronic apparatus is in the second state, the side portion of the first electronic apparatus and the user of the first electronic apparatus are in a contact state.

By combining with the second aspect and the implementation described above, in another implementation of the second aspect, the communicating unit is further operable to: after detecting the state of the first electronic apparatus, if the state of the first electronic apparatus is the second state, generating and sending second data information to the second electronic apparatus, the second data information including the first data information and identification information for indicating that the first electronic apparatus is in the second state.

According to a third aspect, an embodiment of the present disclosure further provides a second electronic apparatus. The second electronic apparatus includes: a receiving unit for receiving first data information sent by a first electronic apparatus connected with the second electronic apparatus; a detecting unit, connected with the receiving unit, for detecting whether the first data information includes identification information for indicating that the first electronic apparatus is in a predetermined state or not, to obtain a detection result; a controlling unit, connected with the receiving unit, for controlling the second electronic apparatus to output a prompt information if the detection result indicates that the first electronic device is not in the predetermined state, and controlling the second electronic apparatus not to output the prompt information, if the detection result indicates that the first electronic device is in the predetermined state.

By combining with the third aspect, in one implementation of the third aspect, the second electronic apparatus further includes: an output unit for outputting the prompt information, if the detection result indicates that the first electronic device is not in the predetermined state; a fixing unit for maintaining a relative positional relationship between the second electronic apparatus and at least a portion of the user's body, if the second electronic apparatus is in a fixed state.

By combining with the third aspect and the implementation described above, in another implementation of the third aspect, the fixing unit has at least the fixed state. The fixing unit is capable of being used as at least a portion of an annular space, or the fixing unit is at least a portion of an approximate annular space which meets a first preset condition. The annular space or the approximate annular space is capable of surrounding a periphery of a columnar body which meets a second preset condition.

One or more of the above-described technical solutions in the embodiments have at least one or more of the technical effects described as below.

1. In the solutions of the embodiments, a state of the first electronic apparatus is detected, when the first electronic apparatus receives first data information; and when the state is a first state, the first data information is sent to a second electronic apparatus connected with the first electronic apparatus, so that the second electronic apparatus, after receiving the first data information, outputs a first prompt information; and outputs a second prompt information when the state is a second state different from the first state. It can be seen that, a state of the first electronic apparatus is detected when the first electronic apparatus receives the first data information, and then it is determined whether the first data information is sent to the second electronic apparatus or not according to the state of the first electronic apparatus. Whether to perform the associated reminding between the electronic apparatuses or not are not determined only by changing connection settings between the electronic apparatuses any more. A new mode for controlling whether to perform the associated reminding between the electronic apparatuses is provided.

2. In the solutions of the embodiments, if the state is the second state, second data information is generated and sent to the second electronic apparatus, the second data information including the first data information and identification information for indicating that the first electronic apparatus is in the second state. Then, the second electronic apparatus receives the first data information sent by the first electronic apparatus; when the first data information does not include the above-described identification information, the prompt information is output; and when the first data information includes the above-described identification information, the prompt information is not output. Thereby, by obtaining the state of the first electronic apparatus, the second electronic apparatus determines whether to output the prompt information or not according to the state of the first electronic apparatus. A new mode for controlling whether to perform the associated reminding between the electronic apparatuses is provided.

DETAILED DESCRIPTION

In technical solutions provided by embodiments of the present disclosure, a state of the first electronic apparatus is detected when the first electronic apparatus receives first data information, and then it is determined whether the first data information is sent to the second electronic apparatus or not according to a state of the first electronic apparatus. A new mode for controlling whether to perform the associated reminding between the electronic apparatuses or not is provided.

Hereinafter, main principles, specific implementation modes and corresponding advantageous effects that can be achieved by the technical solutions of the embodiments will be described in detail in conjunction with the accompanying drawings.

In the present text, the terms "and/or" only describes association relationship of associated objects, which denotes that there are three types of relationships. For example, A and/or B may denote three cases where A exists solely, A and B coexist, and B exists solely. In addition, in the present text, the character "/" generally denotes an "or" relationship between contextual associated objects.

First Embodiment

Figure 1:
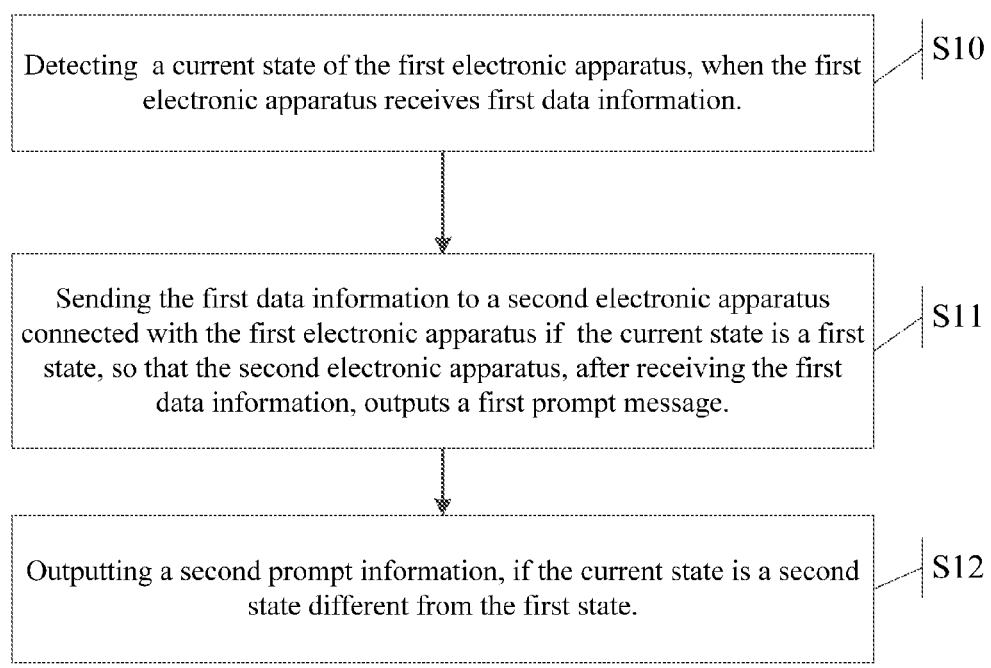
FIG. 1 is a method flowchart of an information processing method according to First Embodiment of the present disclosure.

First Embodiment provides an information processing method, which is applied to an electronic apparatus. The electronic apparatus may be specifically a smart phone, a tablet personal computer, a laptop, etc. As shown in FIG. 1, the method comprises S10, S11, and S12.

S10: detecting and obtaining a state of the first electronic apparatus, when the first electronic apparatus receives first data information.

S11: the electronic apparatus sending the first data information to a second electronic apparatus connected with the first electronic apparatus, if the state is a first state, so that the second electronic apparatus outputs a first prompt information after receiving the first data information.

S12: the electronic apparatus outputting a second prompt information, if the state is a second state different from the first state.

In the First Embodiment, in step S10, the first electronic apparatus may be a smart phone, a tablet personal computer, a laptop, etc. The first data information may be an incoming call, a short message, instant communication information, push information of an application, etc., which will not be limited by the present disclosure.

Specifically, the state of the first electronic apparatus may be the first state or the second state. The first state may be understood as that a user does not use or operate the first electronic apparatus, and the second state may be understood as that the user is using or operating the first electronic apparatus. In the First Embodiment, the state of the first electronic apparatus can be determined in, but not limited to, the two modes described as follows.

In a first mode, the state of the first electronic apparatus is determined by an average power consumption.

In the First Embodiment, if the first electronic apparatus is in the first state, the first electronic apparatus has a first average power consumption. When the first electronic apparatus is in the second state, the first electronic apparatus has a second average power consumption. The first average power consumption is lower than the second average power consumption.

Specifically, if the user is using or operating the first electronic apparatus, due to factors such as relatively more programs running on the first electronic apparatus and high power consumption of a display, the average power consumption of the first electronic apparatus is relatively high. When the user does not use the first electronic apparatus, since fewer programs are running on the first electronic apparatus and the power consumption of the display is low, the average power consumption of the first electronic apparatus is relatively low.

It can be understood as that, generally, when the user does not use or operate the first electronic apparatus, the power consumption of the first electronic apparatus is relatively low, and the first electronic apparatus is in the first state; when the user is using or operating the first electronic apparatus, the power consumption of the first electronic apparatus is relatively high, and the first electronic apparatus is in the second state.

In the specific implementation process, an average power consumption threshold of the first electronic apparatus may be set according to actual situations. Then, the first average power consumption is of a value lower than the above-described average power consumption threshold, and the second average power consumption is of a value higher than the above-described average power consumption threshold.

Further, when the average power consumption of the first electronic apparatus is lower than the average power consumption threshold, it is determined that the first electronic apparatus is in the first state. When the average power consumption of the first electronic apparatus is higher than the average power consumption threshold, it is determined that the first electronic apparatus is in the second state.

In a second mode, the state of the first electronic apparatus is determined according to whether a side portion of the first electronic apparatus is in a contact state.

In the First Embodiment, if the first electronic apparatus is in the first state, the side portion of the first electronic apparatus and a user of the first electronic apparatus are in a non-contact state; if the first electronic apparatus is in the second state, the side portion of the first electronic apparatus and the user of the first electronic apparatus are in a contact state. The side portion is a side portion to be held by the user on the first electronic apparatus.

Specifically, if the user is using or operating the first electronic apparatus, for some portable devices such as a smart phone and a tablet personal computer, the user may hold the first electronic apparatus and operate. Accordingly, whether the side portion is in the contact state or not may be detected by a sensor disposed on the side portion of the first electronic apparatus, so as to further determine the state of the first electronic apparatus.

It can be understood as that, generally, when the user does not use or operate the first electronic apparatus, the side portion of the first electronic apparatus is in the non-contact state, i.e., the first electronic apparatus is in the first state; when the user is using or operating the first electronic apparatus, the side portion of the first electronic apparatus is in the contact state, i.e., the first electronic apparatus is in the second state.

Specifically, the sensor may be a temperature sensor, a pressure sensor, etc., which will not be limited by the present disclosure.

For example, in a case where the sensor is the temperature sensor, when the user holds the side portion of the first electronic apparatus, the temperature sensor disposed on the side portion of the first electronic apparatus can detect that the temperature of the side portion is increased, to further determine that the side portion of the first electronic apparatus is in the contact state.

Next, step S11 is introduced, which is sending the first data information to a second electronic apparatus connected with the first electronic apparatus if the state is a first state, so that the second electronic apparatus outputs a first prompt information after receiving the first data information.

Specifically, the second electronic apparatus may be a wearable device, for example, a wrist-worn device, a head-mounted device, etc. The wrist-worn device may be a device such as a wrist-worn mobile phone, a SmartWatch and a SmartBand. The first prompt information may be image information, text information, audio information, vibrating alert, etc., which will not be limited by the present disclosure.

In the First Embodiment, the first communication mode established between the first electronic apparatus and the second electronic apparatus is different from the second communication mode established between the first electronic apparatus and the third electronic apparatus which sends the first data information.

Specifically, the third electronic apparatus may be a base station, a wireless Access Point (AP), an end-to-end mobile phone, etc. Further, the first communication mode may be Bluetooth, and the second communication mode may be 3G or wifi, etc.

In practice, a maximum direct communication distance of the second communication mode is longer than a maximum direct communication distance of the first communication mode. For example, a communication distance of 3G or wifi is longer than a communication distance of Bluetooth.

For example, here is a scenario. A user a is doing exercise in a yard. the user wears a SmartWatch connected with a smart phone via Bluetooth. The smart phone is placed on the sofa in the living room. At that time, the smart phone receives an incoming call, since the smart phone is in the first state (i.e., the state in which the user does not use or operate it), the smart phone sends data information of the incoming call to the SmartWatch via the Bluetooth connection established, so that SmartWatch outputs a prompt information after receiving the data information of the incoming call.

In the specific implementation process, after the first electronic apparatus sends the first data information to the second electronic apparatus, it is no longer necessary for the first electronic apparatus to output the prompt information, so as not to disturb other person.

For example, here is another scenario. The user a is in a meeting, who wears the SmartWatch connected with the smart phone via Bluetooth. The smart phone is placed on the conference table. At that time, the smart phone receives an incoming call, since the smart phone is in the first state (i.e., the state in which the user does not use or operate it), then the smart phone sends data information of the incoming call to the SmartWatch via the Bluetooth connection established, and meanwhile, the smart phone no longer outputs the prompt information. The SmartWatch, after receiving the data information of the incoming call, outputs the prompt information.

In the above-described solutions, the user a can timely view and handle the information of the incoming call by the SmartWatch, since the smart phone will not output the prompt information, a second repeated prompt for the user a and disturbance to other persons are avoided.

Of course, while the first electronic apparatus (e.g. the smart phone) sends the first data information to the second electronic apparatus (e.g. the SmartWatch), the smart phone may also output the prompt information, to avoid a case that the user fails to timely view the first data information because the prompt information is not output, when the user does not carry the second electronic apparatus.

For example, here is yet another scenario. The user a is swimming, and the user a places both the SmartWatch and the smart phone beside the swimming pool. At that time, the smart phone receives an incoming call, since the smart phone is in the first state (i.e., the state in which the user does not use or operate it), then the smart phone sends the data information of the incoming call to the SmartWatch via the Bluetooth connection established, so that SmartWatch outputs the prompt information when receiving the data information of the incoming call, and meanwhile, the smart phone outputs the prompt information, to prompt the user.

Next, step S12 is described, which is outputting a second prompt information if the state is a second state different from the first state.

Specifically, if the first electronic apparatus is in the second state, i.e., the average power consumption of the first electronic apparatus is higher, and/or, the side portion of the second electronic apparatus is in the contact state, it can be understood as that, the user is using or operating the first electronic apparatus. At this time, when the first electronic apparatus receives the first data information, the prompt information is output by the first electronic apparatus to prompt the user.

Specifically, the second prompt information may be image information, text information, audio information, vibrating alert, etc., which will not be limited by the present disclosure.

For example, here is a scenario. The user a is using the smart phone to browse microblog, i.e., the smart phone is in the second state. At that time, when the smart phone receives an incoming call, the prompt information is output by the smart phone.

In the First Embodiment, since the user is using the first electronic apparatus, the prompt information can be output by the first electronic apparatus to prompt the user, and it is not necessary for the second electronic apparatus to perform the associated reminding.

In the specific implementation process, the above-described technical solutions can be implemented in two modes described as follows.

In a first mode, the first electronic apparatus does not send the first data information to the second electronic apparatus.

Specifically, if the first electronic apparatus is in the second state, the first electronic apparatus will not send the data information to the second electronic apparatus, and the second electronic apparatus cannot receive the first data information, and then will not output the prompt information.

In a second mode, the first electronic apparatus sends the second data information to the second electronic apparatus, and the second information may include the first data information and identification information for indicating the state of the first electronic apparatus.

Specifically, when staying in the second state, the first electronic apparatus sends the identification information for indicating the state of the first electronic apparatus to the second electronic apparatus.

In the second mode which is different from the first mode, the second electronic apparatus can receive the second data information, but will not output the prompt information.

Specifically, the second electronic apparatus, after receiving the second data information, can obtain the state of the first electronic apparatus, so as to determine whether to output the prompt information or not.

For example, here is another. The user a is using the smart phone to browse microblog, i.e., the smart phone is in the second state. At that time, the smart phone receives a short message, then the smart phone outputs the prompt information, and sends both content of the short message and identification information for indicating that the smart phone in the second state to the SmartWatch. At this time, the SmartWatch can receive the short message and store the same, and the SmartWatch can obtain that the state of the first electronic apparatus is the second state, so as to determine that it is not necessary to output the prompt information at that time, and further not to output the prompt information.

In the second mode, if the first electronic apparatus is in the second state, it still sends the first data information to the second electronic apparatus, but identifies the first data information, so that the second electronic apparatus will not prompt repeatedly. Synchronization of the data information between the first electronic apparatus and the second electronic apparatus can be maintained.

Second Embodiment

Second Embodiment of the present disclosure provides an information processing method applied to an electronic apparatus, which is specifically a second electronic apparatus. Specifically, the second electronic apparatus may be a wearable device, for example, a wrist-worn device, a head-mounted device, etc. The wrist-worn device may be a device such as a wrist-worn mobile phone, a SmartWatch and a SmartBand.

Figure 2:
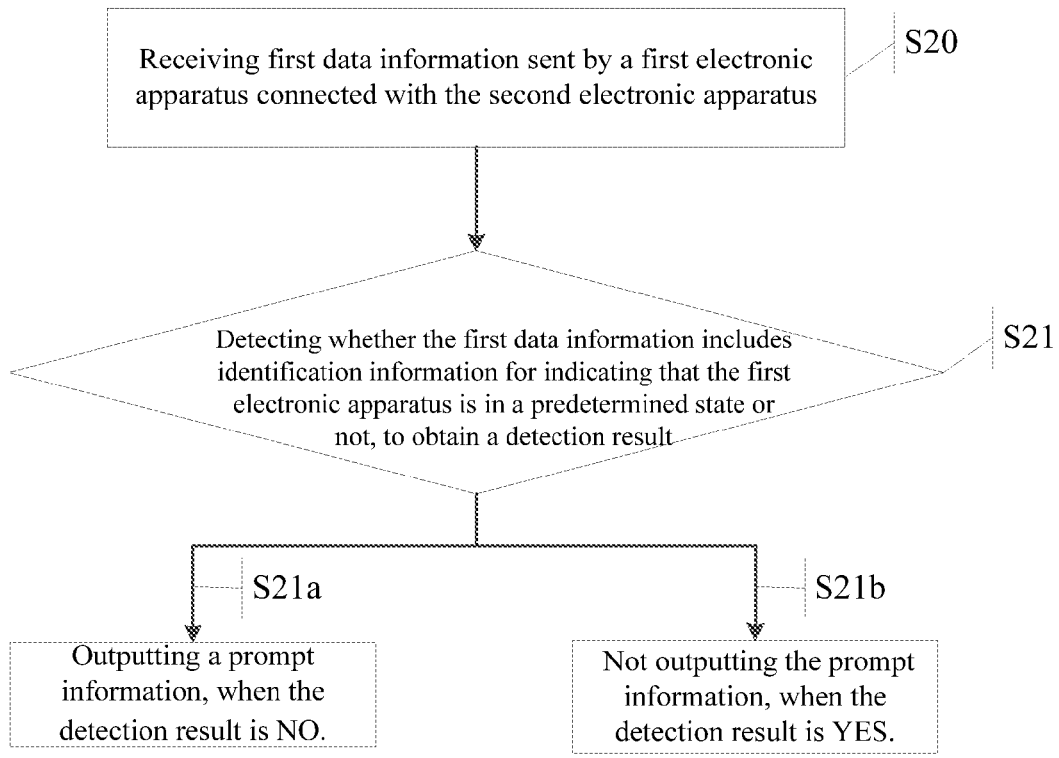
FIG. 2 is a method flowchart of an information processing method according to Second Embodiment of the present disclosure.

As shown in FIG. 2, the method comprises S20, S21, S21a and S21b.

S20: receiving first data information sent by a first electronic apparatus connected with the second electronic apparatus.

Specifically, the second electronic apparatus can establish a connection with the first electronic apparatus via Bluetooth, and receive the first data information sent by the first electronic apparatus via Bluetooth. The first data information may be an incoming call, a short message, instant communication information, push information of an application, etc., which will not be limited by the present disclosure.

Next, step S21 is executed: detecting whether the first data information includes identification information for indicating that the first electronic apparatus is in a predetermined state or not, to obtain a detection result.

In the Second Embodiment, the first electronic apparatus being in a predetermined state means that the user of the first electronic apparatus is using or operating the first electronic apparatus. In a specific implementation process, it can be determined whether the first electronic apparatus is in the predetermined state or not by an average power consumption and a contact state of the first electronic apparatus. Specific descriptions is as the two modes introduced in First Embodiment, which will not be repeated here.

Specifically, when the second electronic apparatus detects that the first data information does not include the identification information, step S21a is executed: outputting a prompt information when the detection result is NO. When the second electronic apparatus detects that the first data information includes the identification information, step S21b is executed: not outputting the prompt information, when the detection result is YES.

For example, here is a scenario. The user a is using the smart phone to browse microblog, i.e., the smart phone is in the second state. At this time, when the smart phone receives an incoming call, the prompt information is output by the smart phone. Both the content of the short message and the identification information for indicating that the smart phone is in the predetermined state are sent to the SmartWatch, and at that time, the SmartWatch can receive the short message, and store the same, but does not output the prompt information.

In the above technical solution, the second electronic apparatus, after receiving the first data information sent by the first electronic apparatus, detects whether the first data information includes the identification information or not, and determines whether to output the prompt information or not according to the detection result, so that the second electronic apparatus will not prompt repeatedly when unnecessary (i.e., when the user is using or operating the first electronic apparatus), and can maintain synchronization of the data information between the first electronic apparatus and the second electronic apparatus.

Third Embodiment

Figure 3:
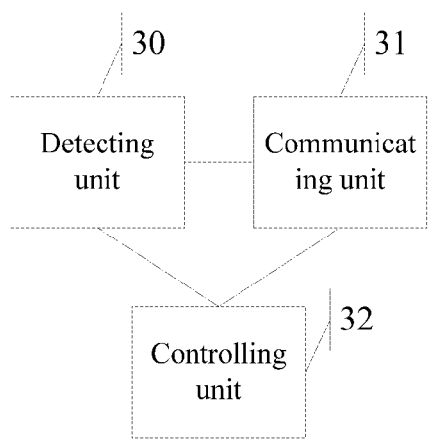
FIG. 3 is a structural block diagram of a first electronic apparatus according to Third Embodiment of the present disclosure.

Based on the same inventive concept, Third Embodiment of the present disclosure provides an electronic apparatus, which is specifically a first electronic apparatus. As shown in FIG. 3, the first electronic apparatus includes: a detecting unit 30, for detecting a state of the first electronic apparatus when the first electronic apparatus receives first data information; a communicating unit 31, connected with the detecting unit 30, for sending the first data information to the second electronic apparatus connected with the first electronic apparatus if the state is a first state, so that the second electronic apparatus outputs a first prompt information after receiving the first data information; and a controlling unit 32, connected with the detecting unit 30, for controlling the first electronic apparatus to output a second prompt information if the state is a second state different from the first state.

Optionally, the controlling unit 32 is connected with the communicating unit 31, and the controlling unit 32 is further used for controlling the communicating unit 31 not to send the first data information to the second electronic apparatus if the state is the second state.

Optionally, the first electronic apparatus establishes a connection with the second electronic apparatus in a first communication mode; the first electronic apparatus establishes a connection in a second communication mode with a third electronic apparatus which sends the first data information, the second communication mode being different from the first communication mode.

Optionally, if the first electronic apparatus is in the first state, the first electronic apparatus has a first average power consumption; if the first electronic apparatus is in the second state, the first electronic apparatus has a second average power consumption. The first average power consumption is lower than the second average power consumption.

Optionally, if the first electronic apparatus is in the first state, a side portion of the first electronic apparatus and a user of the first electronic apparatus are in a non-contact state; if the first electronic apparatus is in the second state, the side portion of the first electronic apparatus and the user of the first electronic apparatus are in a contact state. The side portion is a side portion to be held by the user on the first electronic apparatus.

Optionally, the communicating unit 31 is further used for: after the detecting the state of the first electronic apparatus, generating and sending second data information to the second electronic apparatus if the state is the second state. The second data information includes the first data information and identification information for indicating that the first electronic apparatus is in the second state.

Fourth Embodiment

Figure 4:
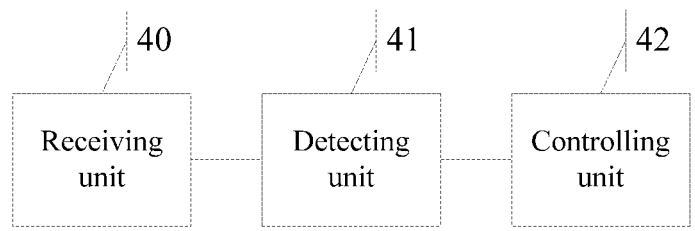
FIG. 4 is a structural block diagram of a second electronic apparatus according to Fourth Embodiment of the present disclosure.

Based on the same inventive concept, Fourth Embodiment of the present disclosure provides an electronic apparatus, which is specifically a second electronic apparatus. As shown in FIG. 4, the second electronic apparatus includes: a receiving unit 40, for receiving first data information sent by a first electronic apparatus connected with the second electronic apparatus; a detecting unit 41, connected with the receiving unit 40, for detecting whether the first data information includes identification information for indicating that the first electronic apparatus is in a predetermined state or not, to obtain a detection result; a controlling unit 42, connected with the receiving unit 40, for controlling the second electronic apparatus to output a prompt information when the detection result is NO, and controlling the second electronic apparatus not to output the prompt information when the detection result is YES.

Figure 5:
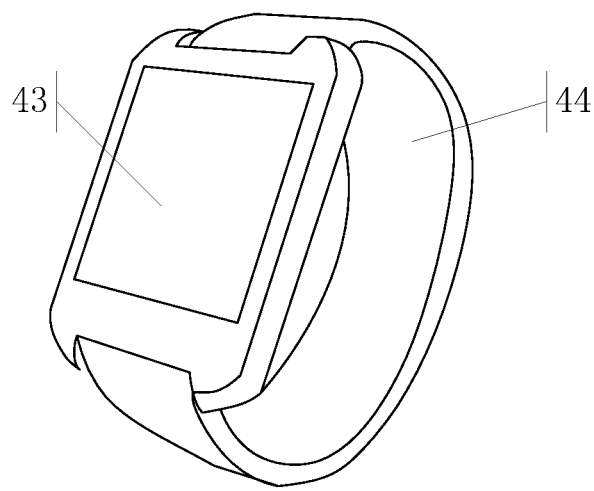
FIG. 5 is a structural schematic diagram of the second electronic apparatus according to Fourth Embodiment of the present disclosure.

In the Fourth Embodiment, as shown in FIG. 5, the second electronic apparatus further includes: an output unit 43, for outputting the prompt information, when the detection result is NO; a fixing unit 44, for maintaining a relative positional relationship between the second electronic apparatus and at least a portion of the user's body if the second electronic apparatus is in a fixed state.

Specifically, the output unit 43 may be a display, an audio output unit, etc., and correspondingly, the prompt information may be image information, text information, audio information, etc., which will not be limited by the present disclosure.

In the specific implementation process, attribute parameters of the fixing unit 44 should match body parameters of the user. For example, the electronic apparatus needs to be fixed onto the user's wrist. Then, when the fixing unit 44 maintains the relative positional relationship, an effective perimeter thereof around the wrist should be greater than or equal to a perimeter of the wrist. For example, the perimeter of the wrist is generally between 13 cm and 17 cm, and then the effective perimeter of the fixing unit 44 should be at least 17 cm.

In the specific implementation process, the fixing unit 44 has at least the fixed state; the fixing unit 44 can be used as at least a portion of an annular space, or the fixing unit 44 is at least a portion of an approximate annular space which meets a first preset condition. The annular space or the approximate annular space can surround a periphery of a columnar body which meets a second preset condition.

Figure 6A:
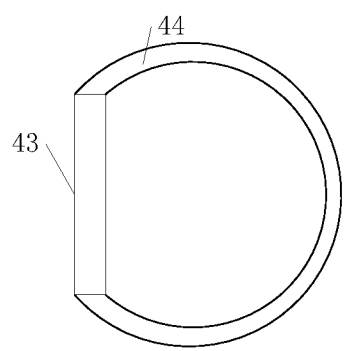
FIG. 6a and FIG. 6b are structural schematic diagrams of a fixing unit of the second electronic apparatus according to Fourth Embodiment of the present disclosure.

Specifically, when the fixing unit 44 only includes a portion, the fixing unit 44 per se can form an annular space, as shown in FIG. 6*a*. If the fixing unit 44 is made of a lightweight elastic material, the fixing unit 44 has the fixed state and a non-fixed state; and if the fixing unit 44 is made of a hard material, the fixing unit 44 just has the fixed state.

Figure 6B:
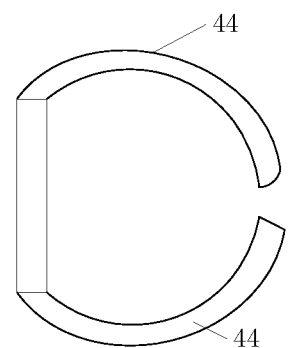

When the fixing unit 44 includes two portions, a first end of a first portion is connected with a first side portion of the output unit 43, a third end of a second portion is connected with a second side portion of the second output unit 43, and the first side portion and the second side portion are two opposite side portions of the output unit 43, as shown in FIG. 6*b*. Further, if the fixing unit 44 is made of a hard material, and a second end of the first portion and a fourth end of the second portion are in a non-connect state, the fixing unit 44 only has the fixed state, and at this time, the first portion and the second portion are two portions of the approximate annular space. The approximate annular space meets the first preset condition, i.e., that a diameter between the second end of the first portion and the fourth end of the second portion is less than the body part wearing the electronic apparatus, e.g., a diameter of the wrist. At this time, the wrist is deemed as a columnar body. The columnar body meets the second preset condition, i.e., that a diameter thereof is greater than that of the annular space. Further, if the electronic apparatus needs to be relatively fixed in a certain position or a certain height of the columnar body, the diameter of both ends of the columnar body should be less than the diameter of the annular space.

One or more of the above-described technical solutions in the embodiments have at least one or more of the technical effects described as below.

1. In the solutions of the embodiments, a state of the first electronic apparatus is detected when the first electronic apparatus receives first data information; and the first data information is sent to a second electronic apparatus connected with the first electronic apparatus if the state is a first state, so that the second electronic apparatus, after receiving the first data information, outputs a first prompt information, and outputs a second prompt information if the state is a second state different from the first state. It can be seen that, a state of the first electronic apparatus is detected when the first electronic apparatus receives the first data information, and then it is determined whether the first data information is sent to the second electronic apparatus or not according to the state of the first electronic apparatus. Whether to perform the associated reminding between the electronic apparatuses or not are not determined only by changing connection settings between the electronic apparatuses any more. A new mode for controlling whether to perform the associated reminding between the electronic apparatuses is provided.

2. In the solutions of the embodiments, if the state is the second state, second data information is generated and sent to the second electronic apparatus, the second data information including the first data information and identification information for indicating that the first electronic apparatus is in the second state, and then, the second electronic apparatus receives the first data information sent by the first electronic apparatus; when the first data information does not include the above-described identification information, the prompt information is output; and when the first data information includes the above-described identification information, the prompt information is not output. Thereby, by obtaining the state of the first electronic apparatus, the second electronic apparatus determines whether to output the prompt information or not according to the state of the first electronic apparatus. Whether to perform the associated reminding between the electronic apparatuses or not are not determined only by changing connection settings between the electronic apparatuses any more. A new mode for controlling whether to perform the associated reminding between the electronic apparatuses is provided.

Those skilled in the art should understand that, the embodiments may be provided as a method, a system, or a computer program product. Therefore, the present disclosure may adopt a sheer hardware embodiment, a sheer software embodiment, or an embodiment combining software and hardware aspects. Moreover, the present disclosure may adopt the form of computer program product which is implemented on one or more computer usable storage mediums (including, but not limited to, a magnetic storage device, a CD-ROM, an optical storage device, etc.) with computer usable program codes stored thereon.

The present disclosure is described herein with reference to flowcharts and/or block diagrams of methods, apparatuses (systems), and computer program products according to the embodiments of the invention. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatus to form a machine, such that devices for implementing functions specified by one or more flows in a flowchart and/or one or more blocks in a block diagram may be generated by executing the instructions with the processor of the computer or other programmable data processing apparatus.

These computer program instructions may also be stored in a computer-readable memory that can direct a computer or other programmable data processing apparatus to function in a particular manner, such that the instructions stored in the computer-readable memory produce a manufactured article including an instruction device, the instruction device implementing the functions specified by one or more flows in a flowchart and/or one or more blocks in a block diagram.

These computer program instructions may also be loaded onto a computer or other programmable data processing apparatus, such that a series of process steps may be executed on the computer or other programmable data processing apparatus to produce process implemented by the computer. Thereby, the instructions executed on the computer or other programmable data processing apparatus provide steps of the functions specified by one or more flows in a flowchart and/or one or more blocks in a block diagram.

Specifically, the computer program instructions corresponding to the information processing method in the embodiment can be stored on an optical disk, a hard disk, a U-disk and other storage mediums. When the computer program instructions corresponding to the information processing method stored on the storage medium are read or executed by an electronic apparatus, the method comprises steps of: detecting a state of the first electronic apparatus when the first electronic apparatus receives first data information; sending the first data information to a second electronic apparatus connected with the first electronic apparatus if the state is a first state, so that the second electronic apparatus outputs a first prompt information after receiving the first data information; and outputting the second prompt information, if the state is a second state different from the first state.

Optionally, some other computer instructions are stored in the storage mediums, these computer instructions are executed after the computer instructions corresponding to the step of detecting a state of the first electronic apparatus are executed, and when they are executed, the method comprises steps of: not sending, by the first electronic apparatus, the first data information to the second electronic apparatus, if the state is the second state.

The first electronic apparatus may establish a connection with the second electronic apparatus in a first communication mode; and the first electronic apparatus establishes a connection in a second communication mode with a third electronic apparatus which sends the first data information, the second communication mode being different from the first communication mode.

When the first electronic apparatus is in the first state, the first electronic apparatus may have a first average power consumption; if the first electronic apparatus is in the second state, the first electronic apparatus may have a second average power consumption; wherein, the first average power consumption is lower than the second average power consumption.

When the first electronic apparatus is in the first state, a side portion of the first electronic apparatus and a user of the first electronic apparatus may be in a non-contact state; if the first electronic apparatus is in the second state, the side portion of the first electronic apparatus and the user of the first electronic apparatus may be in a contact state. The side portion may be a side portion to be held by the user on the first electronic apparatus.

Some other computer instructions may be stored in the storage mediums, these computer instructions are executed after the computer instructions corresponding to the step of detecting a state of the first electronic apparatus are executed, and when they are executed, the method comprises steps of: generating and sending a second data information to the second electronic apparatus if the state is the second state. The second data information may include the first data information and identification information for indicating that the first electronic apparatus is in the second state.

Specifically, the computer program instructions corresponding to the information processing method in the embodiment can be stored on an optical disk, a hard disk, a U-disk and other storage mediums. When the computer program instructions corresponding to the information processing method stored on the storage medium are read or executed by an electronic apparatus, the steps as follow are included: receiving first data information sent by a first electronic apparatus connected with the second electronic apparatus; detecting whether the first data information includes identification information for indicating that the first electronic apparatus is in a predetermined state or not, to obtain a detection result; and outputting a prompt information when the detection result is NO; not outputting the prompt information when the detection result is YES.

Although the preferred embodiments have been described, once those skilled in the art know the basic inventive concept, they can make other variations and modifications to these embodiments. Therefore, the appended claims intend to be construed as including the preferred embodiments and all the variations and modifications that fall into the protection scope of the present disclosure.

It is evident that one person skilled in the art can make various changes or modifications to the present disclosure without departure from the spirit and scope of the invention. Thus, if these changes and modifications to the present disclosure are within the scope of the claims of the present disclosure and equivalent technologies, the present disclosure also intends to include all such changes and modifications within its scope.

The invention claimed is:

1. An information processing method comprising:
   detecting a state of a first electronic apparatus upon the first electronic apparatus receiving first data information;
   if the state of the first electronic apparatus is a first state, the first electronic apparatus sends the first data information to a second electronic apparatus connected with the first electronic apparatus, so that the second electronic apparatus outputs a first prompt information after receiving the first data information; and the first electronic apparatus outputs a second prompt information, if the state of the first electronic apparatus is a second state that is different from the first state, wherein the state of the first electronic apparatus is the first state when the first electronic apparatus is not being used or operated by a user, and the state of the first electronic apparatus is the second state when the first electronic apparatus is being used or operated by the user and wherein, after detecting the state of the first electronic apparatus, the method further comprises generating and sending second data information to the second electronic apparatus if the state of the first electronic apparatus is the second state, the second data information including the first data information and identification information for indicating that the first electronic apparatus is in the second state.

2. The method of claim 1, wherein after detecting the state of the first electronic apparatus, the method further comprises not sending, by the first electronic apparatus, the first data information to the second electronic apparatus, if the state of the first electronic apparatus is the second state.

3. The method of claim 1, wherein the first electronic apparatus establishes a connection with the second electronic apparatus in a first communication mode; and the first electronic apparatus establishes a connection in a second communication mode with a third electronic apparatus which sends the first data information, the second communication mode being different from the first communication mode.

4. The method of claim 1, wherein, if the first electronic apparatus is in the first state, the first electronic apparatus has a first average power consumption; and if the first electronic apparatus is in the second state, the first electronic apparatus has a second average power consumption; wherein the first average power consumption is lower than the second average power consumption.

5. The method of claim 1, wherein, if the first electronic apparatus is in the first state, a side portion of the first electronic apparatus and a user of the first electronic apparatus are in a non-contact state and if the first electronic apparatus is in the second state, the side portion of the first electronic apparatus and the user of the first electronic apparatus are in a contact state.

6. A first electronic apparatus, including:
a detecting unit for detecting a state of the first electronic apparatus upon the first electronic apparatus receiving first data information;
a communicating unit, connected with the detecting unit, for sending the first data information to a second electronic apparatus connected with the first electronic apparatus, if the state of the first electronic apparatus is a first state, so that the second electronic apparatus outputs a first prompt information after receiving the first data information; and
a controlling unit, connected with the detecting unit, for controlling the first electronic apparatus to output a second prompt information if the state of the first electronic apparatus is a second state that is different from the first state,
wherein the state of the first electronic apparatus is the first state when the first electronic apparatus is not being used or operated by a user, and the state of the first electronic apparatus is the second state when the first electronic apparatus is being used or operated by the user and wherein the communicating unit is further operable to, after detecting the state of the first electronic apparatus, if the state of the first electronic apparatus is the second state, generate and send second data information to the second electronic apparatus, the second data information including the first data information and identification information for indicating that the first electronic apparatus is in the second state.

7. The first electronic apparatus of claim 6, wherein, the controlling unit is connected with the communicating unit, and the controlling unit is further operable to control the communicating unit not to send the first data information to the second electronic apparatus, if the state of the first electronic apparatus is the second state.

8. The first electronic apparatus of claim 6, wherein, the first electronic apparatus is operable to establish a connection with the second electronic apparatus in a first communication mode and the first electronic apparatus is operable to establish a connection in a second communication mode with a third electronic apparatus which sends the first data information, wherein the second communication mode is different from the first communication mode.

9. The first electronic apparatus of claim 6, wherein, if the first electronic apparatus is in the first state, the first electronic apparatus has a first average power consumption; and if the first electronic apparatus is in the second state, the first electronic apparatus has a second average power consumption; wherein, the first average power consumption is lower than the second average power consumption.

10. The first electronic apparatus of claim 6, wherein, if the first electronic apparatus is in the first state, a side portion of the first electronic apparatus and a user of the first electronic apparatus are in a non-contact state; and if the first electronic apparatus is in the second state, the side portion of the first electronic apparatus and the user of the first electronic apparatus are in a contact state.

11. A communication system including a first electronic apparatus and a second electronic apparatus connected with the first electronic apparatus, wherein the first electronic apparatus includes:
a first detecting unit for detecting a state of the first electronic apparatus upon the first electronic apparatus receiving first data information;
a communicating unit, connected with the detecting unit, for sending the first data information to the second electronic apparatus, if the state of the first electronic apparatus is a first state, and for generating and sending second data information to the second electronic apparatus if the state of the first electronic apparatus is the second state different from the first state, the second data information including the first data information and identification information for indicating that the first electronic apparatus is in the second state; and
a first controlling unit, connected with the detecting unit, for controlling the first electronic apparatus to output a second prompt information if the state of the first electronic apparatus is the second state,
the second electronic apparatus includes:
a receiving unit for receiving the first data information sent by the first electronic apparatus connected with the second electronic apparatus;
a second detecting unit, connected with the receiving unit, for detecting whether the first data information includes the identification information for indicating that the first electronic apparatus is in a predetermined state or not, to obtain a detection result; and a second controlling unit, connected with the receiving unit, for controlling the second electronic apparatus to output a first prompt information if the detection result indicates that the first electronic apparatus is not in the predetermined second state, and controlling the second electronic apparatus not to output the first prompt information, if the detection result indicates that the first electronic apparatus is in the predetermined second state, wherein the state of the first electronic apparatus is the first state when the first electronic apparatus is not being used or operated by a user, and the state of the first electronic apparatus is the second state when the first electronic apparatus is being used or operated by the user.

12. The communication system of claim 11 wherein the second apparatus further includes:

an output unit for outputting the first prompt information, if the detection result indicates that the first electronic apparatus is not in the second state; and a fixing unit for maintaining a relative positional relationship between the second electronic apparatus and at least a portion of the user's body, if the second electronic apparatus is in a fixed state.

13. The communication system of claim 12, wherein the fixing unit has at least the fixed state; the fixing unit is capable of being used as at least a portion of an annular space, or the fixing unit is at least a portion of an approximate annular space which meets a first preset condition; wherein, the annular space or the approximate annular space is capable of surrounding a periphery of a columnar body which meets a second preset condition.

* * * * *